United States Patent
Heo

(10) Patent No.: US 7,289,091 B2
(45) Date of Patent: Oct. 30, 2007

(54) METHOD OF STABLY DRIVING LIQUID CRYSTAL DISPLAY APPARATUS AND LIQUID CRYSTAL DISPLAY APPARATUS USING THE METHOD

(75) Inventor: Hae-Jin Heo, Ulioo-gun (KR)

(73) Assignee: Samsung SDI Co., Ltd., Suwon-si (KR)

( * ) Notice: Subject to any disclaimer, the term of this patent is extended or adjusted under 35 U.S.C. 154(b) by 616 days.

(21) Appl. No.: 10/798,289

(22) Filed: Mar. 12, 2004

(65) Prior Publication Data

US 2004/0257323 A1 Dec. 23, 2004

(30) Foreign Application Priority Data

Jun. 18, 2003 (KR) ............... 10-2003-0039346

(51) Int. Cl.
*G09G 3/36* (2006.01)
*G09G 5/02* (2006.01)

(52) U.S. Cl. .................. 345/88; 345/87; 345/690; 345/697

(58) Field of Classification Search ............ 345/32, 345/84, 87, 88, 204, 690, 697, 4, 5, 6
See application file for complete search history.

(56) References Cited

U.S. PATENT DOCUMENTS

| 4,090,219 A | * | 5/1978 | Ernstoff et al. ............. 348/742 |
| 5,337,068 A | * | 8/1994 | Stewart et al. ............. 345/88 |
| 6,188,379 B1 | * | 2/2001 | Kaneko ..................... 345/102 |

FOREIGN PATENT DOCUMENTS

KR 2003-27717 4/2003

* cited by examiner

*Primary Examiner*—Richard Hjerpe
*Assistant Examiner*—My-Chau T. Tran
(74) *Attorney, Agent, or Firm*—Stein, McEwen & Bui, LLP

(57) ABSTRACT

A method of stably driving a liquid crystal display apparatus and a liquid crystal display apparatus, the apparatus including a liquid crystal display panel having data electrode lines allocated for three colors and scan electrode lines crossing the data electrode lines and a lighting device installed in the back of the liquid crystal display panel to sequentially generate back lights having different colors, so that a unit driving period is divided into first, second, and third color driving periods. The liquid crystal display apparatus sequentially applies a single scan pulse to the scan electrode lines during a two-color driving period, in which the two color driving periods among the three color driving periods are combined, and activate two colors while the single scan pulse is applied to the scan electrode lines.

23 Claims, 14 Drawing Sheets

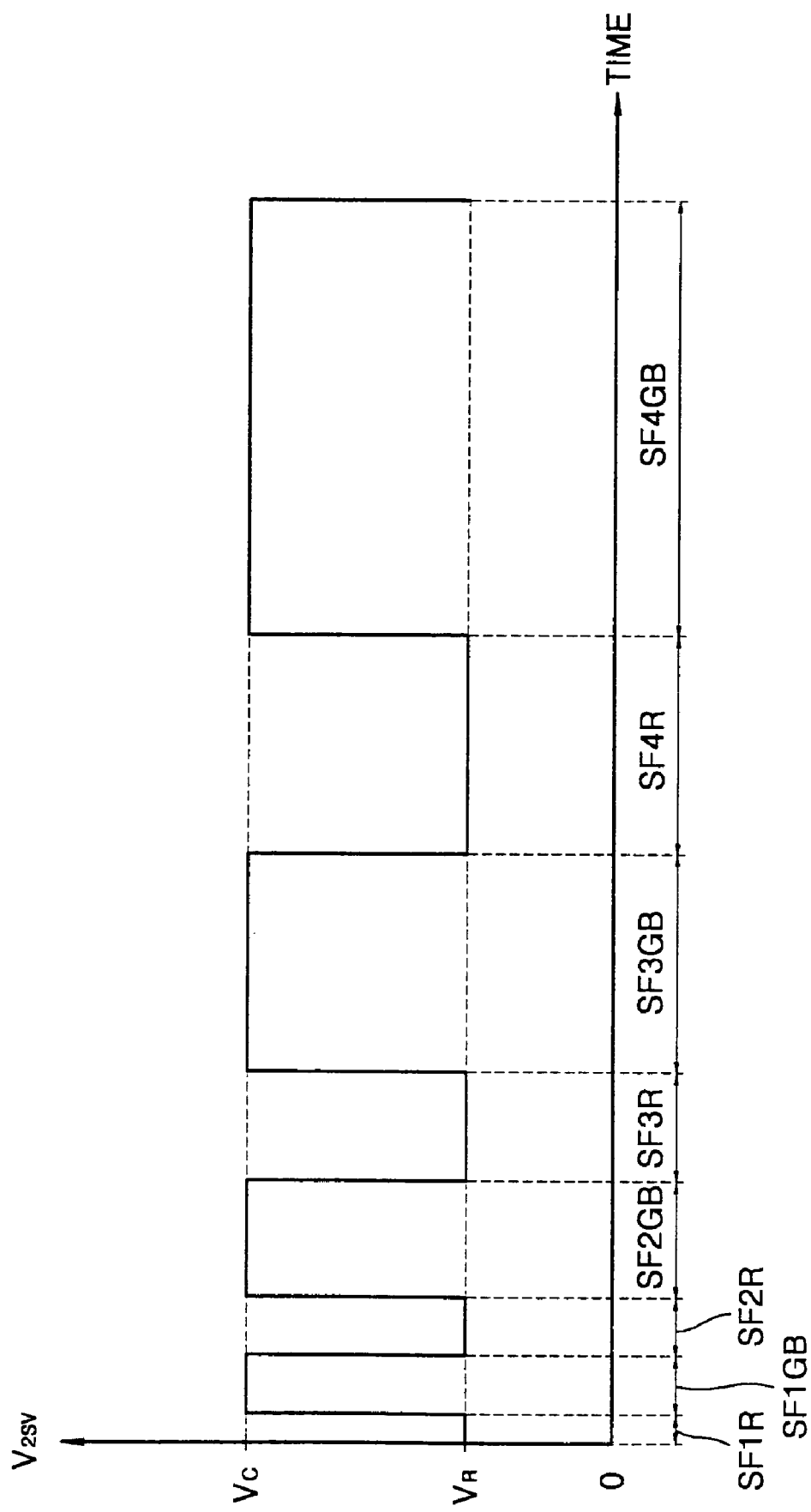

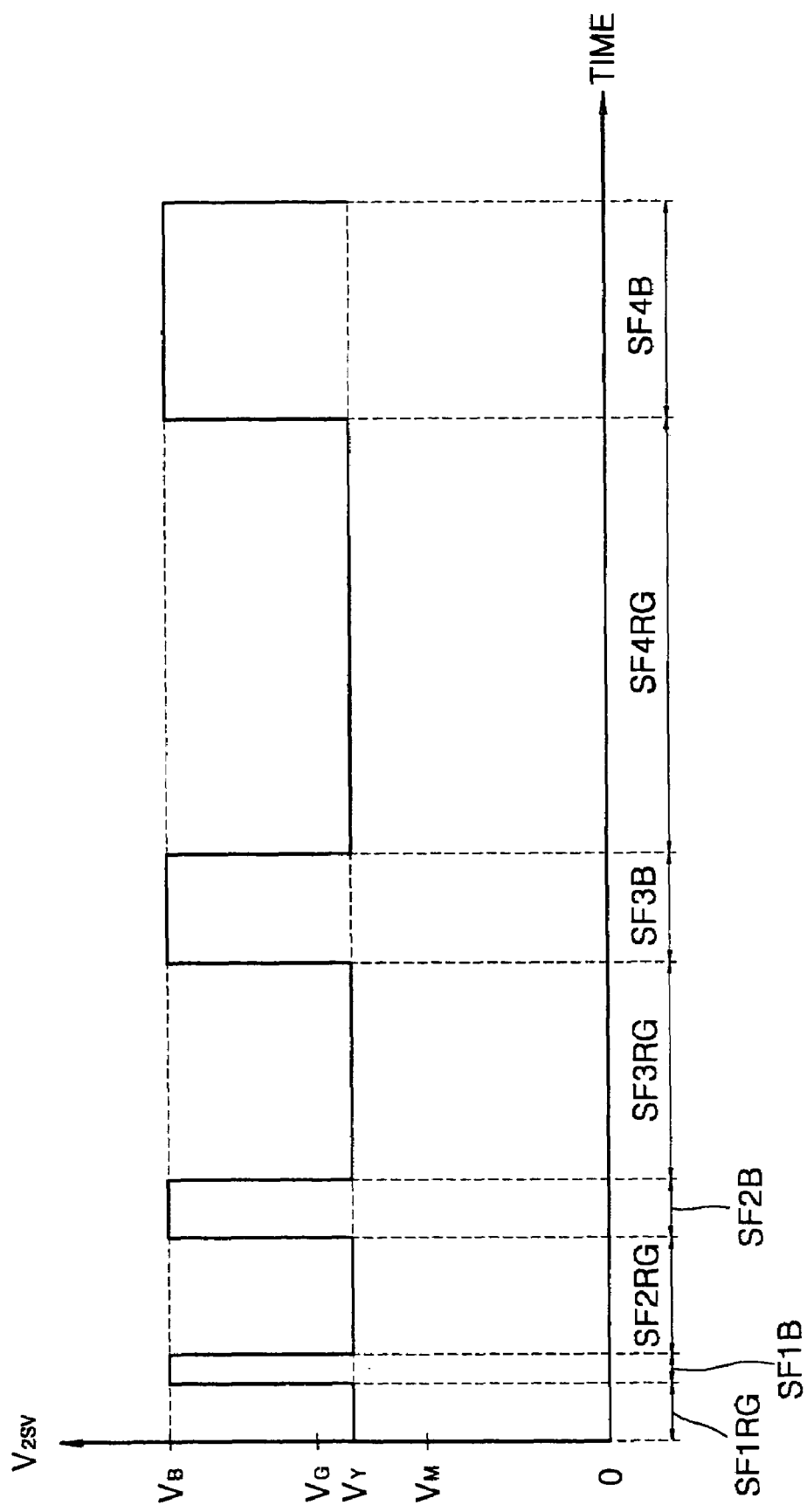

METHOD OF STABLY DRIVING LIQUID CRYSTAL DISPLAY APPARATUS AND LIQUID CRYSTAL DISPLAY APPARATUS USING THE METHOD

CROSS-REFERENCE TO RELATED APPLICATIONS

This application claims the benefit of Korean Patent Application No. 2003-39346, filed on Jun. 18, 2003, in the Korean Intellectual Property Office, the disclosure of which is incorporated herein by reference.

BACKGROUND OF THE INVENTION

1. Field of the Invention

The present invention relates to a method of driving a liquid crystal display (LCD) apparatus and an LCD apparatus using the method, and more particularly, to a method of driving a field-sequential LCD apparatus including subfields for displaying a grayscale in each frame and a field-sequential LCD apparatus using the method.

2. Description of the Related Art

In a conventional field-sequential LCD apparatus, for example, disclosed in Korean Patent Publication No. 03-27717, a lighting device is installed under an LCD panel to sequentially generate red, green, and blue back lights in each subfield, i.e., a unit driving period. In addition, each subfield is divided into red, green, and blue driving subfields. In a red driving subfield, only a red back light is generated and liquid crystals positioned at red cells are driven. In a green driving subfield, only a green back light is generated and liquid crystals positioned at green cells are driven. In a blue driving subfield, only a blue back light is generated and liquid crystals positioned at blue cells are driven.

In such conventional field-sequential LCD apparatus, to display a grayscale using time division, each frame is divided into a plurality of subfields, and each subfield is divided into red, green, and blue driving subfields. Accordingly, a high-speed scan operation is required, and therefore, a width of a scan pulse is not sufficient to stably drive the LCD apparatus.

SUMMARY OF THE INVENTION

The present invention provides a method of stably driving a liquid crystal display (LCD) apparatus at a high speed by efficiently increasing a width of a scan pulse, and an LCD apparatus using the method.

According to an aspect of the present invention, there is provided a method of driving an LCD apparatus, which includes an LCD panel having data electrode lines allocated for three colors and scan electrode lines crossing the data electrode lines and a lighting device installed in the back of the LCD panel to sequentially generate back lights having different colors, so that a unit driving period is divided into first, second, and third color driving periods. The method includes sequentially applying a single scan pulse to the scan electrode lines during a two-color driving period, in which two color driving periods among the three color driving periods are combined and two colors are activated while the single scan pulse is applied to the scan electrode lines.

Accordingly, only a single scan pulse can be sequentially applied to scan electrode lines during two color driving periods which are combined. Accordingly, a width of a scan pulse increases efficiently so that high-speed operation can be performed stably.

The liquid display apparatus further includes a two-color spectrum shutter which is installed in front of the LCD panel and allows only front lights having fourth and fifth colors, to be incident onto the LCD panel. Here, the lighting device generates back lights having sixth and seventh colors, so that lights having the first through third colors, are output through selected cells of the LCD panel and the two-color spectrum shutter by combining two among the fourth through seventh colors.

Accordingly, during the combined two-color driving period among the three color driving periods, the two-color spectrum shutter allows front lights having the same color to be incident onto the LCD panel, and the lighting device generates back lights having the same color during two color driving periods among the three color driving periods. Therefore, the two-color spectrum shutter and the lighting device can operate more stably.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7A is a timing chart of a waveform of a voltage applied to the two-color spectrum shutter shown in FIG. 2A in a frame shown in FIG. 6A;

FIG. 7C is a timing chart of a waveform of a voltage applied to the two-color spectrum shutter shown in FIG. 2B in a frame shown in FIG. 6C;

DETAILED DESCRIPTION OF THE PREFERRED EMBODIMENTS

Figure 1:
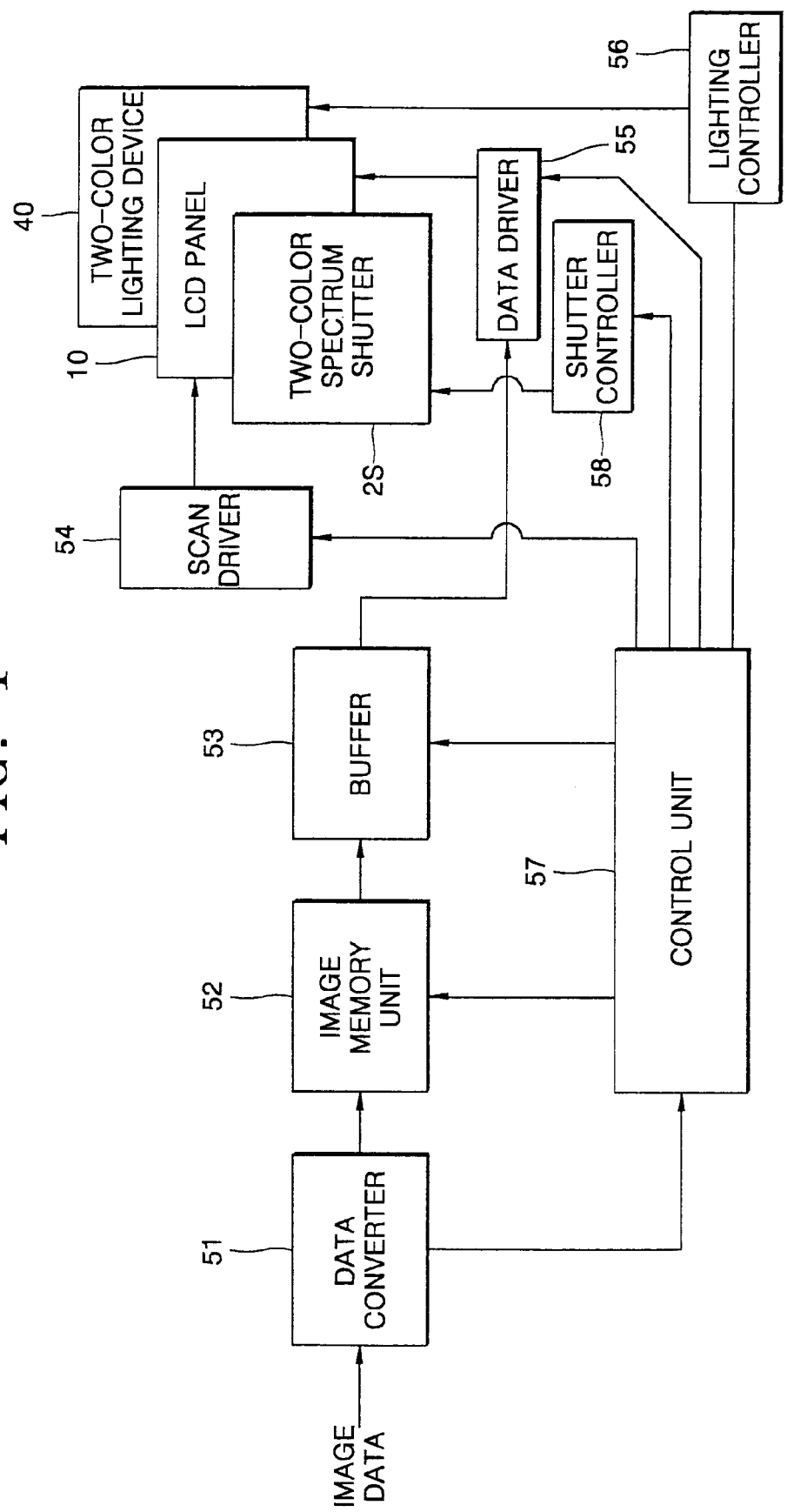
FIG. 1 is a diagram of a field-sequential liquid crystal display (LCD) apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a field-sequential liquid crystal display (LCD) apparatus according to an embodiment of the present invention includes a LCD panel 10, a two-color lighting device 40, a two-color spectrum shutter 2S, a data converter 51, an image memory unit 52, a buffer 53, a scan driver 54, a data driver 55, a lighting controller 56, a control unit 57, and a shutter controller 58.

The LCD panel 10 includes data electrode lines allocated for three colors and scan electrode lines formed to cross the data electrode lines.

The two-color lighting device 40 is controlled by the lighting controller 56. It is installed in the back of the LCD panel 10 and sequentially generates backlights having two colors, corresponding to operations of the two-color spectrum shutter 2S in each subfield.

The control unit 57 controls operations of the data converter 51, the image memory unit 52, the buffer 53, the scan driver 54, the data driver 55, the lighting controller 56, and the shutter controller 58. Here, a unit driving period, for example, a subfield, is divided into three color driving periods: a first color driving period, a second color driving period, and a third color driving period. In addition, two color driving periods among the three-color driving periods are combined into a two-color driving period. In this situation, only a single scan pulse is sequentially applied to the scan electrode lines in the two-color driving period, and driving for displaying two colors is performed while the single scan pulse is applied. Accordingly, a width of a scan pulse is increased efficiently, allowing the field-sequential LCD apparatus to be stably driven at a high speed. This will be described later in detail.

The two-color spectrum shutter 2S is installed in front of the LCD panel 10 and is controlled by the shutter controller 58 to allow only front lights having fourth and fifth colors to be incident onto the LCD panel 10. The two-color lighting device 40 installed in the back of the LCD panel 10 sequentially generates backlights having sixth and seventh colors corresponding to operations of the two-color spectrum shutter 2S in each subfield.

Accordingly, during one two-color driving period among the three color driving periods, the two-color spectrum shutter 2S allows only front lights having the same color to be incident onto the LCD panel 10. In addition, during another two-color driving period among the three color driving periods, only back lights having the same color can be generated by the two-color lighting device 40. As a result, the two-color spectrum shutter 2S and the two-color lighting device 40 can operate stably. This stable operation will be described later in detail.

The data converter 51 controlled by the control unit 57 converts input image data into red data, green data, and blue data and stores the red, green, and blue data in the image memory unit 52 in response to a write signal from the control unit 57. Each color data stored in the image memory unit 52 is transmitted to the buffer 53 in response to a read signal from the control unit 57. The color data input to the buffer 53 is input to the data driver 55 in series. The data driver 55 processes the serial data of different colors and drives the data electrode lines of the LCD panel 10. The scan driver 54 drives the scan electrode lines of the LCD panel 10 in response to a timing control signal from the control unit 57.

Figure 2A:
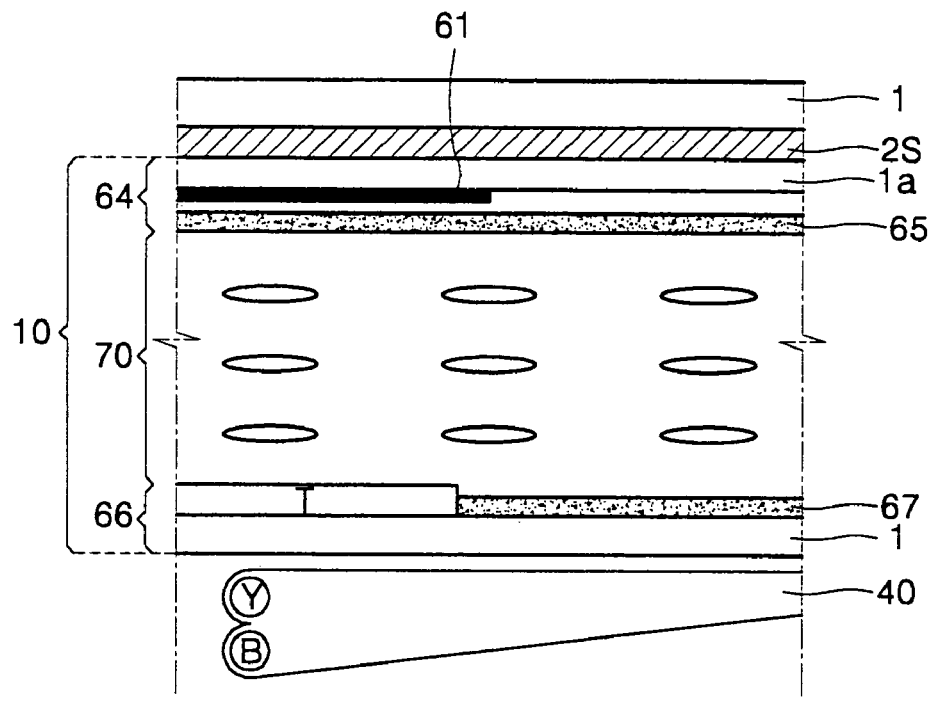
FIG. 2A shows cross-sections of an LCD panel, a lighting device, and a two-color spectrum shutter when the two-color spectrum shutter is implemented by photonic ink and the lighting device generates yellow (Y) and blue (B) lights in the LCD apparatus shown in FIG. 1.
Figure 2B:
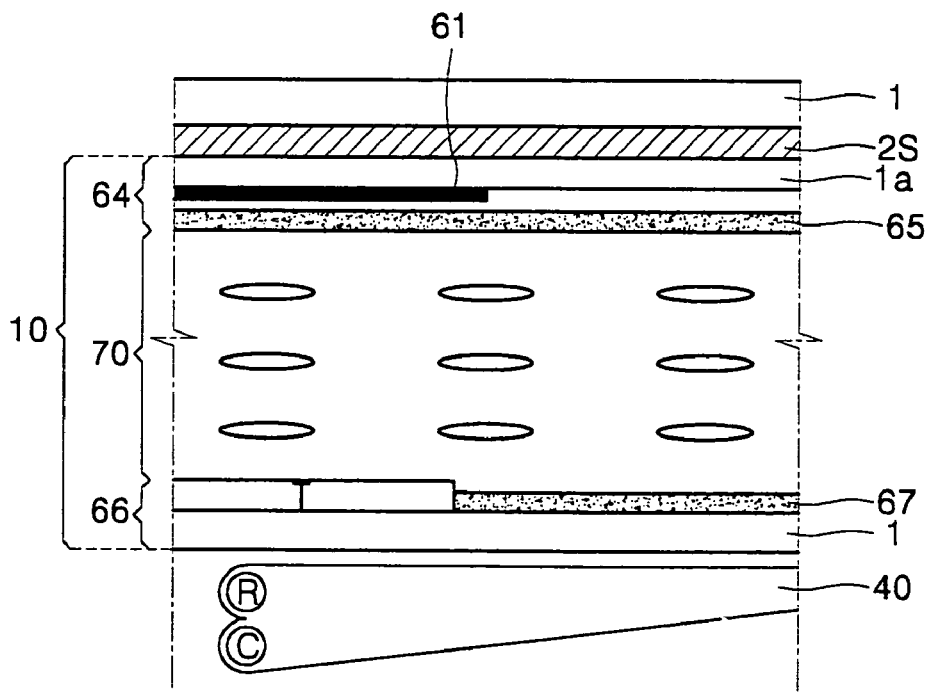
FIG. 2B shows cross-sections of the LCD panel, the lighting device, and the two-color spectrum shutter when the two-color spectrum shutter is implemented by photonic ink and the lighting device generates red (R) and cyan (C) lights in the LCD apparatus shown in FIG. 1.

FIG. 2A shows cross-sections of the LCD panel 10, the two-color lighting device 40, and the two-color spectrum shutter 2S when the two-color spectrum shutter 2S is implemented by photonic ink and the two-color lighting device 40 generates yellow (Y) and blue (B) lights in the LCD apparatus shown in FIG. 1. FIG. 2B shows cross-sections of the LCD panel 10, the two-color lighting device 40, and the two-color spectrum shutter 2S when the two-color spectrum shutter 2S is implemented by photonic ink and the two-color lighting device 40 generates red (R) and cyan (C) lights in the LCD apparatus shown in FIG. 1.

Figure 3:
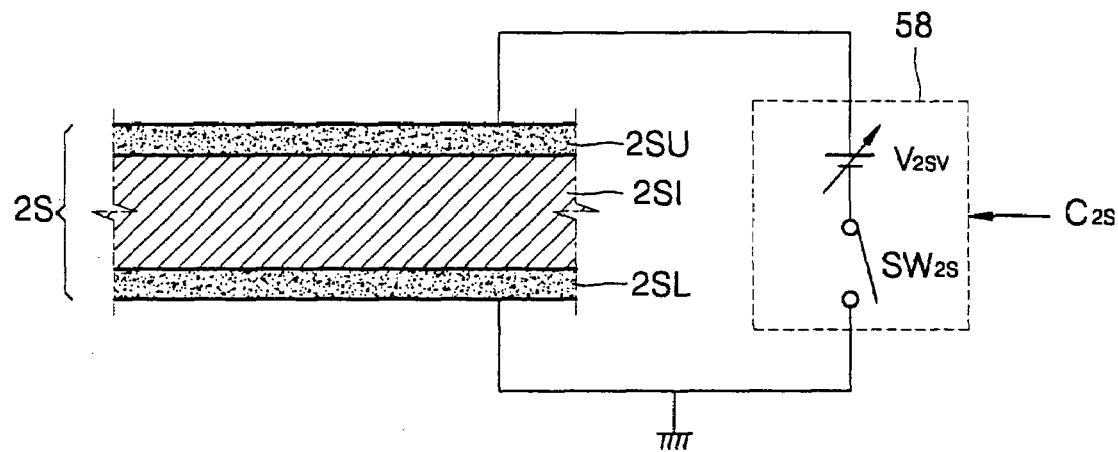
FIG. 3 shows a detailed cross-section of the two-color spectrum shutter shown in FIGS. 2A and 2B and illustrates operations of a shutter controller.

FIG. 3 shows a detailed cross-section of the two-color spectrum shutter 2S shown in FIGS. 2A and 2B and illustrates operations of the shutter controller 58.

Referring to FIGS. 1 through 3, a transparent insulation layer 1, a thin-film transistor layer T, and scan electrode lines 67 are formed on a rear substrate 66. A liquid crystal layer 70 is formed between the rear substrate 66 and a front substrate 64. Data electrode lines 65, a transparent insulation layer 1a, and a black matrix 61 are formed on the front substrate 64.

The two-color spectrum shutter 2S is implemented by photonic ink, which changes color according to an applied voltage $V_{2SV}$, and is attached to the front substrate 64. More specifically, in the two-color spectrum shutter 2S, a photonic ink layer 2SI is formed between a transparent front electrode plate 2SU and a transparent rear electrode plate 2SL. The transparent insulation layer 1 is formed on the two-color spectrum shutter 2S, for protection.

The shutter controller 58 includes a power supply, which generates a variable shutter voltage $V_{2SV}$, and a voltage switch $SW_{2S}$. The shutter controller 58 sequentially applies color conversion voltages to the photonic ink layer 2SI according to a shutter control signal $C_{2S}$ from the control unit 57 in each subfield.

Figure 4A:
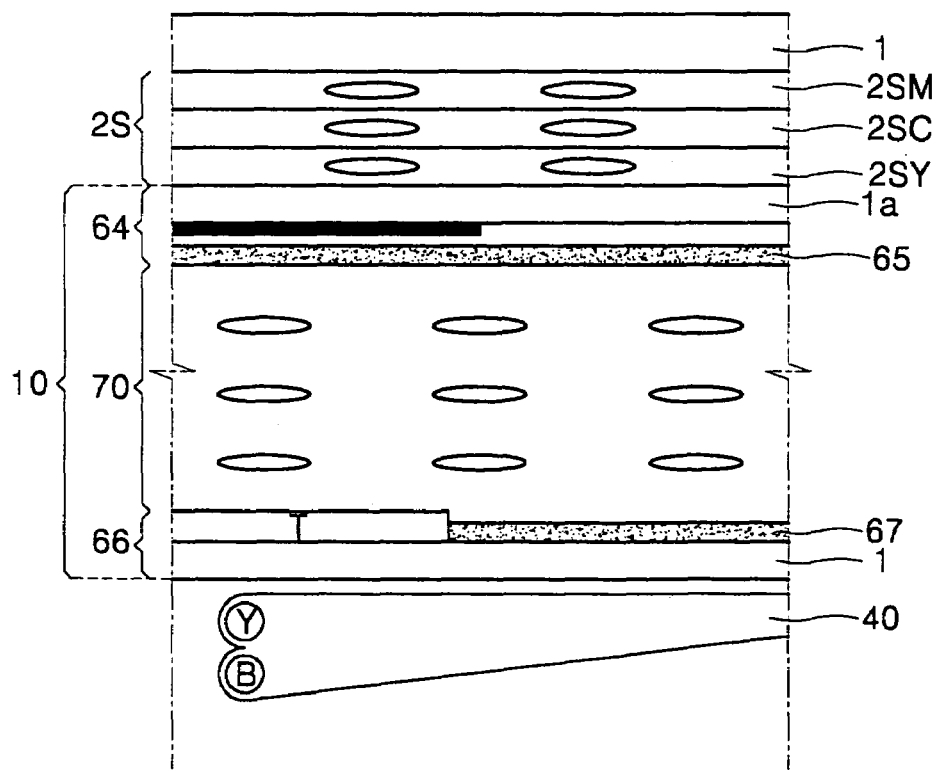
FIG. 4A shows cross-sections of an LCD panel, the lighting device, and the two-color spectrum shutter when the two-color spectrum shutter is implemented by liquid crystal panels and the lighting device generates yellow and blue lights in the LCD apparatus shown in FIG. 1.
Figure 4B:
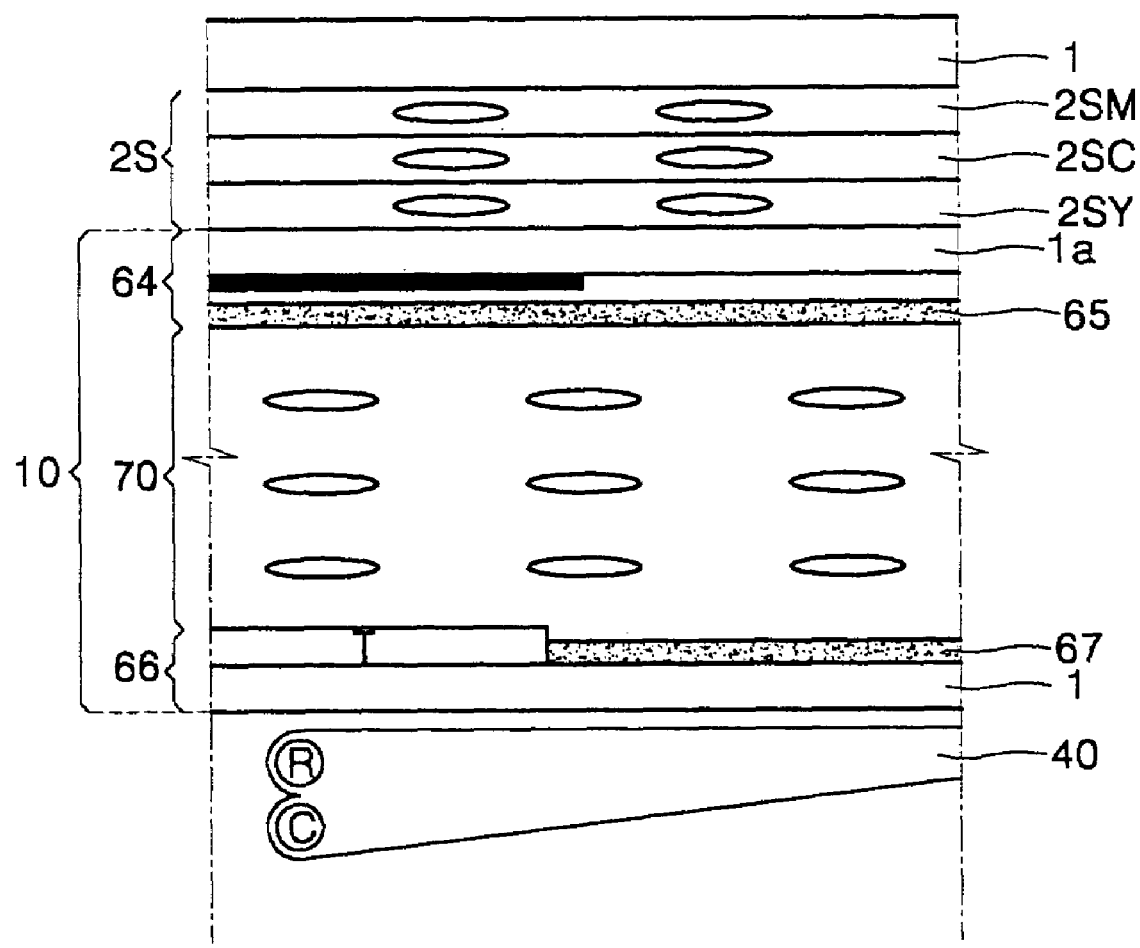
FIG. 4B shows cross-sections of an LCD panel, the lighting device, and the two-color spectrum shutter when the two-color spectrum shutter is implemented by liquid crystal panels and the lighting device generates red and cyan lights in the LCD apparatus shown in FIG. 1.

FIG. 4A shows cross-sections of the LCD panel 10, the two-color lighting device 40, and the two-color spectrum shutter 2S when the two-color spectrum shutter 2S is implemented by liquid crystal panels 2SM, 2SC, and 2SY and the two-color lighting device 40 generates yellow and blue lights in the LCD apparatus shown in FIG. 1. FIG. 4B shows cross-sections of the LCD panel 10, the two-color lighting device 40, and the two-color spectrum shutter 2S when the two-color spectrum shutter 2S is implemented by liquid crystal panels 2SM, 2SC, and 2SY and the two-color lighting device 40 generates red and cyan lights in the LCD apparatus shown in FIG. 1.

Figure 5:
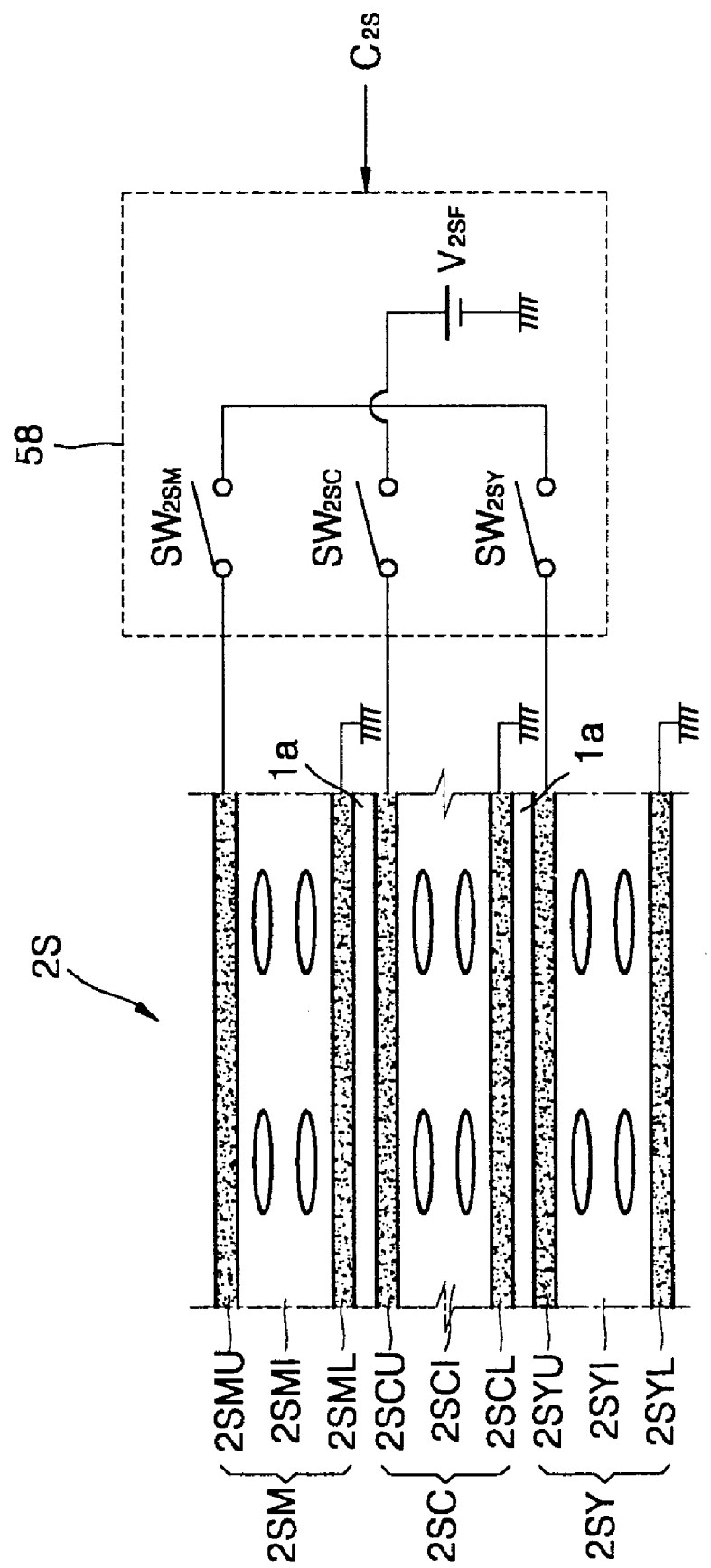
FIG. 5 shows a detailed cross-section of the two-color spectrum shutter shown in FIGS. 4A and 4B and illustrates operations of the shutter controller.

FIG. 5 shows a detailed cross-section of the two-color spectrum shutter 2S shown in FIGS. 4A and 4B and illustrates operations of the shutter controller 58. In FIGS. 2A, 2B, 4A, and 4B, the same reference characters denote the members having the same functions.

Referring to FIGS. 1 and 4A through 5, the two-color spectrum shutter 2S includes three liquid crystal panels 2SM, 2SC, and 2SY in a stack. The first liquid crystal panel 2SY outputs light in a yellow wavelength to the LCD panel 10 at a predetermined driving voltage $V_{2SF}$ according to a refraction difference in a liquid crystal layer 2SYI and a thickness of the liquid crystal layer 2SYI. The second liquid crystal panel 2SC outputs light in a cyan wavelength to the LCD panel 10 at the predetermined driving voltage $V_{2SF}$ according to a refraction difference in a liquid crystal layer 2SCI and a thickness of the liquid crystal layer 2SCI. The third liquid crystal panel 2SM outputs light in a magenta (magenta) wavelength to the LCD panel 10 at the predetermined driving voltage $V_{2SF}$ according to a refraction difference in a liquid crystal layer 2SMI and a thickness of the liquid crystal layer 2SMI.

More specifically, in the first liquid crystal panel 2SY, the liquid crystal layer 2SYI is formed between a transparent front electrode plate 2SYU and a transparent rear electrode plate 2SYL. In the second liquid crystal panel 2SC, the liquid crystal layer 2SCI is formed between a transparent front electrode plate 2SCU and a transparent rear electrode plate 2SCL. In the third liquid crystal panel 2SM, the liquid crystal layer 2SMI is formed between a transparent front electrode plate 2SMU and a transparent rear electrode plate 2SML.

Here, the shutter controller 58 includes a power supply, which generates a fixed shutter voltage $V_{2SF}$, and voltage switches $SW_{2SY}$, $SW_{2SC}$, and $SW_{2SM}$. The shutter controller 58 controls the voltage switches $SW_{2SY}$, $SW_{2SC}$, and $SW_{2SM}$ according to the shutter control signal $C_{2S}$ from the control unit 57.

Figure 6A:
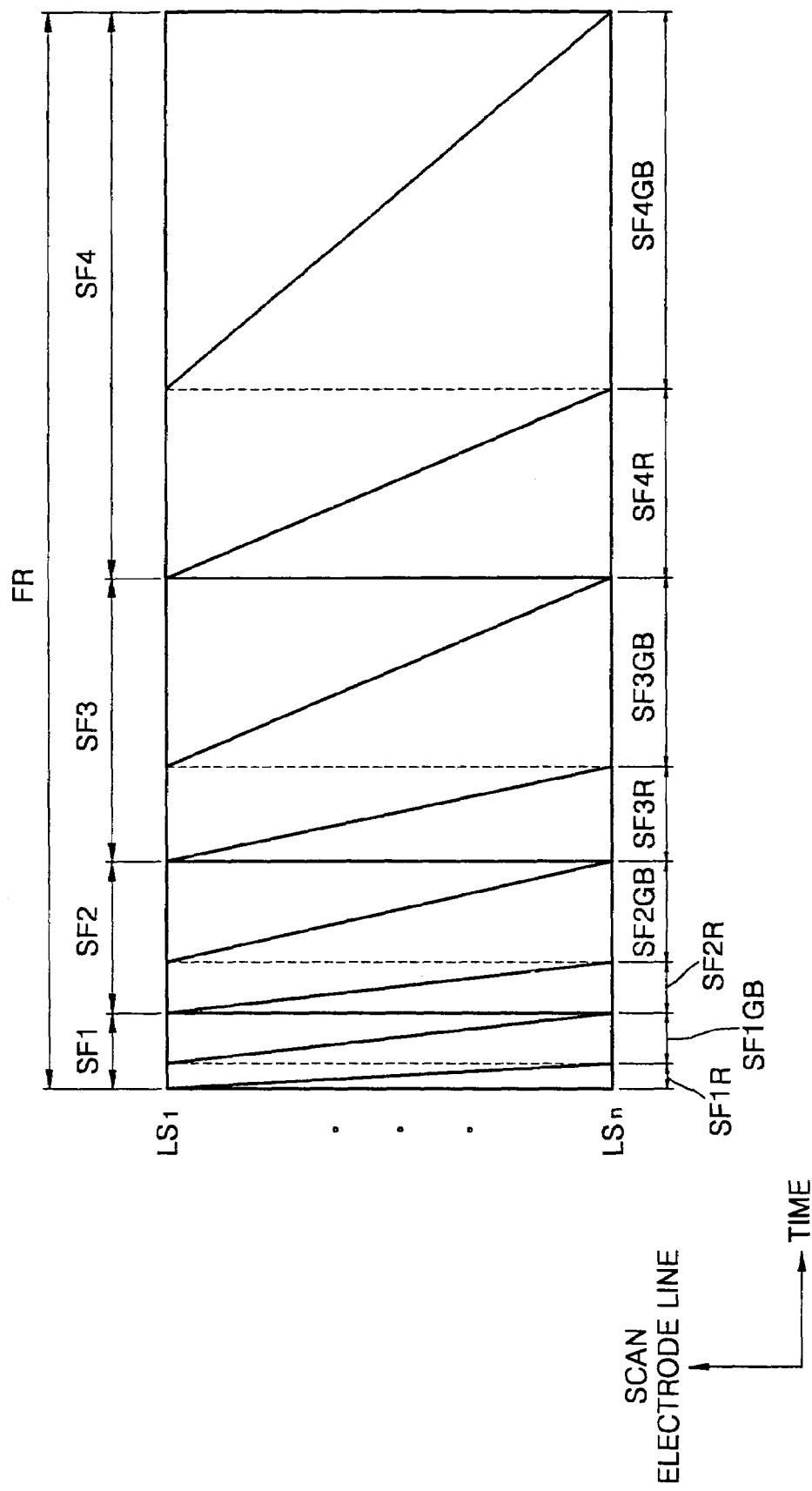
FIG. 6A is a timing chart illustrating a method of driving the field-sequential LCD apparatus shown in FIG. 1, according to an embodiment of the present invention where a second color driving period and a third color driving period are combined.

FIG. 6A is a timing chart illustrating a method of driving the field-sequential LCD apparatus shown in FIG. 1, according to an embodiment of the present invention where green (G) and blue subfields of the second and the third color driving periods are combined into a two-color driving period. Referring to FIG. 6A, a unit frame FR includes four subfields SF1 through SF4 so that a gray scale can be displayed using time division. The four subfields SF1 through SF4 include red driving subfields SF1R, SF2R, SF3R, and SF4R, respectively, and green-blue combined driving subfields SF1GB, SF2GB, SF3GB, and SF4GB, respectively.

Figure 6B:
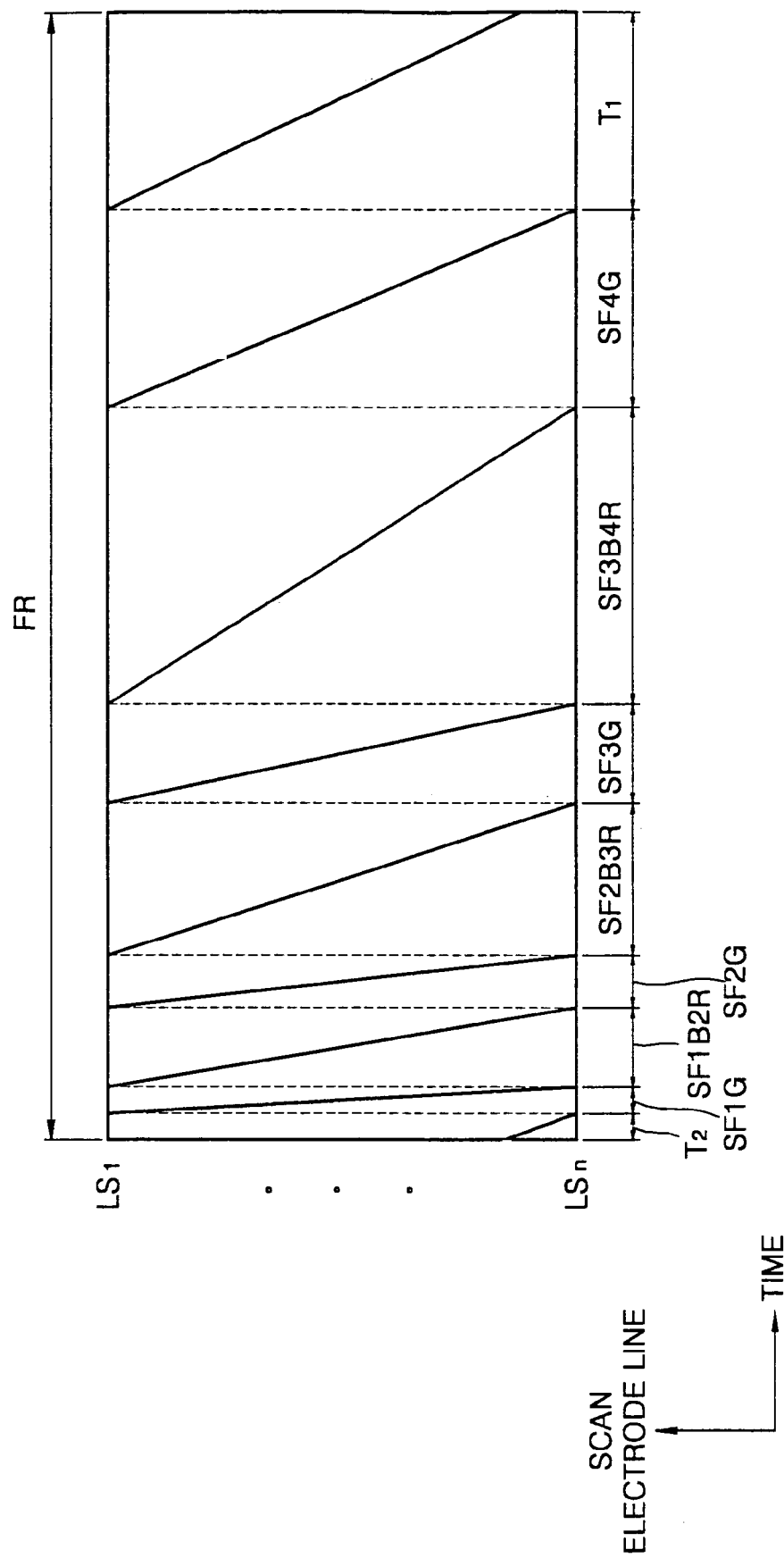
FIG. 6B is a timing chart illustrating a method of driving the field-sequential LCD apparatus shown in FIG. 1, according to another embodiment of the present invention where a first color driving period and the third color driving period are combined.

FIG. 6B is a timing chart illustrating a method of driving the field-sequential LCD apparatus shown in FIG. 1, according to another embodiment of the present invention where the first color driving period and the third color driving period are combined. Referring to FIG. 6B, a unit frame FR includes green driving subfields SF1G, SF2G, SF3G, and SF4G and a red-blue combined driving subfields SF1B2R, SF2B3R, and SF3B4R.

Figure 6C:
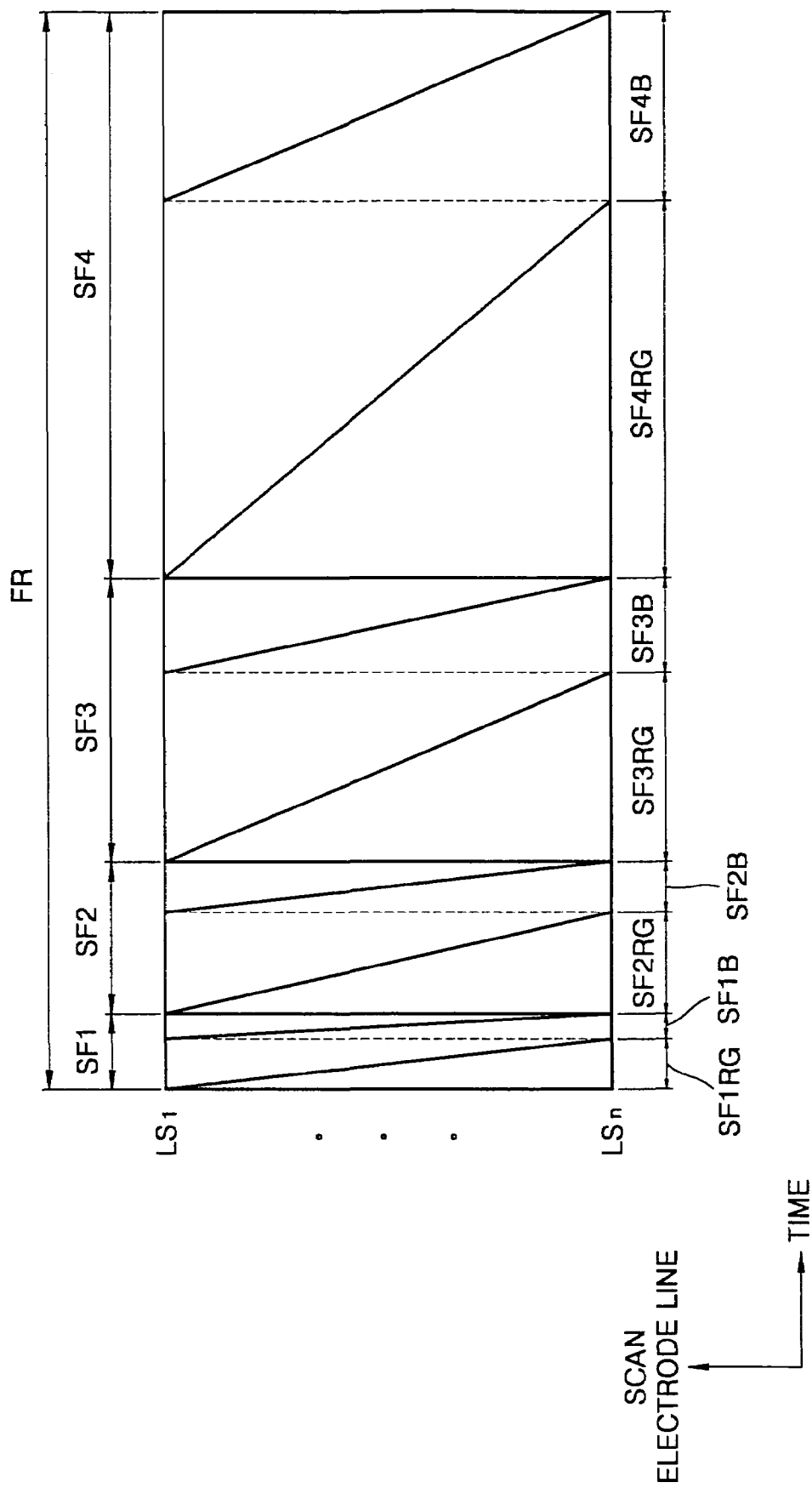
FIG. 6C is a timing chart illustrating a method of driving the field-sequential LCD apparatus shown in FIG. 1, according to still another embodiment of the present invention where the first color driving period and the second color driving period are combined.

FIG. 6C is a timing chart illustrating a method of driving the field-sequential LCD apparatus shown in FIG. 1, according to still another embodiment of the present invention where the first color driving period and the second color driving period are combined. Referring to FIG. 6C, the four subfields SF1 through SF4 include blue-driving subfields SF1B, SF2B, SF3B, and SF4B, respectively, and red-green combined driving subfields SF1RG, SF2RG, SF3RG, and SF4RG, respectively.

FIG. 7A is a timing chart of a waveform of a voltage applied to the two-color spectrum shutter 2S shown in FIG. 2A in the frame FR shown in FIG. 6A. Referring to FIG. 7A, the second and third color driving periods are combined. Table 1 shows colors activated by the two-color spectrum shutter 2S and the two-color lighting device 40 in each color driving subfield.

TABLE 1

|  | Color driving subfield No. | | |
| --- | --- | --- | --- |
|  | 1 | 2 | 3 |
| Color activated by the two-color spectrum shutter 2S | Red | Cyan | Cyan |
| Color activated by the two-color lighting device 40 | Yellow | Yellow | Blue |
| Color displayed in color driving subfield | Red | Green | Blue |

Referring to FIGS. 1 through 3, 6A, and 7A and Table 1, in each of the red driving subfields SF1R, SF2R, SF3R, and SF4R, all scan electrode lines $LS_1$ through $LS_n$ and data electrode lines corresponding to red are driven so that cells are selected. The shutter controller 58 applies a red conversion voltage $V_R$ to the photonic ink layer 2SI in response to the shutter control signal $C_{2S}$ from the control unit 57. As a result, the color of the photonic ink layer 2SI is converted into red, and thus, red front light is incident from the two-color spectrum shutter 2S onto the selected cells of the LCD panel 10 and then reflected by the two-color lighting device 40. Consequently, the red front light from the two-color spectrum shutter is output through the selected cells together with yellow backlight from the two-color lighting device 40.

In each of the green-blue combined driving subfields SF1GB, SF2GB, SF3GB, and SF4GB, the shutter controller 58 applies a cyan conversion voltage $V_C$ to the photonic ink layer 2SI in response to the shutter control signal $C_{2S}$ from the control unit 57. As a result, the color of the photonic ink layer 2SI is converted into cyan, and thus, cyan front light is incident from the two-color spectrum shutter 2S onto the selected cells of the LCD panel 10, then reflected by the two-color lighting device 40, and output through the selected cells. Here, during a time corresponding to the second color driving period in a time while only a single scan pulse is applied to a scan electrode line, only cyan front light and yellow back light are output through the selected cells of the LCD panel 10 and the two-color spectrum shutter 2S. In addition, during a time corresponding to the third color driving period in the time while only the single scan pulse is applied to the scan electrode line, only cyan front light and blue back light are output through the selected cells of the LCD panel 10 and the two-color spectrum shutter 2S.

Figure 7B:
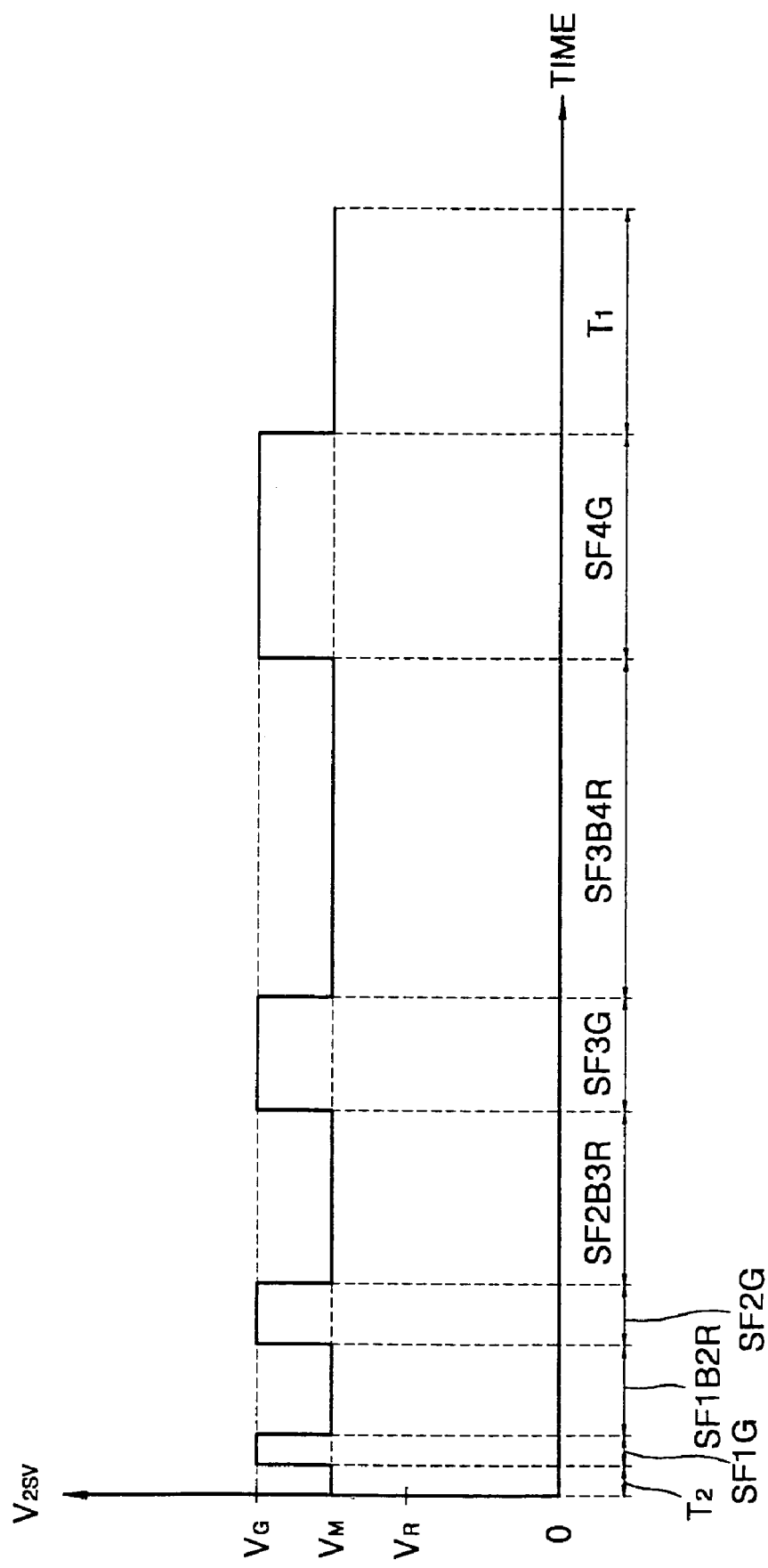
FIG. 7B is a timing chart of a waveform of a voltage applied to the two-color spectrum shutter shown in FIG. 2B in a frame shown in FIG. 6B.

FIG. 7B is a timing chart of a waveform of a voltage applied to the two-color spectrum shutter 2S shown in FIG. 2B in the frame FR shown in FIG. 6B. Referring to FIG. 7B, the first and third color driving periods are combined. Table 2 shows colors activated by the two-color spectrum shutter 2S and the two-color lighting device 40 in each color driving subfield.

TABLE 2

|  | Color driving subfield No. | | |
| --- | --- | --- | --- |
|  | 1 | 2 | 3 |
| Color activated by the two-color spectrum shutter 2S | Magenta | Green | Magenta |
| Color activated by the two-color lighting device 40 | Red | Cyan | Cyan |
| Color displayed in color driving subfield | Red | Green | Blue |

Referring to FIGS. 1 through 3, 6B, and 7B and Table 2, in each of the green driving subfields SF1G, SF2G, SF3G, and SF4G, all of the scan electrode lines $LS_1$ through $LS_n$ and data electrode lines corresponding to green are driven so that cells are selected. The shutter controller 58 applies a green conversion voltage $V_G$ to the photonic ink layer 2SI in response to the shutter control signal $C_{2S}$ from the control unit 57. As a result, the color of the photonic ink layer 2SI is converted into green, and thus, green front light is incident from the two-color spectrum shutter 2S onto the selected cells of the LCD panel 10 and then reflected by the two-color lighting device 40. Consequently, the green front light from the two-color spectrum shutter is output through the selected cells together with cyan back light from the two-color lighting device 40.

In each of the red-blue combined driving subfields SF1B2R, SF2B3R, and SF3B4R, the shutter controller 58 applies a magenta conversion voltage $V_M$ to the photonic ink layer 2SI in response to the shutter control signal $C_{2S}$ from the control unit 57. As a result, the color of the photonic ink layer 2SI is converted into magenta, and thus, magenta front light is incident from the two-color spectrum shutter 2S onto the selected cells of the LCD panel 10, then reflected by the two-color lighting device 40, and output through the selected cells. Here, during a time corresponding to the first color driving period a time while only a single scan pulse is applied to a scan electrode line, only magenta front light and red back light are output through the selected cells of the LCD panel 10 and the two-color spectrum shutter 2S. In addition, during a time corresponding to the third color driving period in the time while only the single scan pulse is applied to the scan electrode line, only magenta front light and cyan back light are output through the selected cells of the LCD panel 10 and the two-color spectrum shutter 2S.

FIG. 7C is a timing chart of a waveform of a voltage applied to the two-color spectrum shutter 2S shown in FIG. 2B in the frame FR shown in FIG. 6C. Referring to FIG. 7C, the first and second color driving periods are combined. Table 3 shows colors activated by the two-color spectrum shutter 2S and the two-color lighting device 40 in each color driving subfield.

TABLE 3

|  | Color driving subfield No. | | |
| --- | --- | --- | --- |
|  | 1 | 2 | 3 |
| Color activated by the two-color spectrum shutter 2S | Yellow | Yellow | Blue |
| Color activated by the two-color lighting device 40 | Red | Cyan | Cyan |
| Color displayed in color driving subfield | Red | Green | Blue |

Referring to FIGS. 1 through 3, 6C, and 7C and Table 2, in each of the blue driving subfields SF1B, SF2B, SF3B, and SF4B, all of the scan electrode lines $LS_1$ through $LS_n$ and data electrode lines corresponding to blue are driven so that cells are selected. The shutter controller 58 applies a blue conversion voltage $V_B$ to the photonic ink layer 2SI in response to the shutter control signal $C_{2S}$ from the control unit 57. As a result, the color of the photonic ink layer 2SI is converted into blue, and thus, blue front light is incident from the two-color spectrum shutter 2S onto the selected cells of the LCD panel 10 and then reflected by the two-color lighting device 40. Consequently, the blue front light from the two-color spectrum shutter is output through the selected cells together with cyan back light from the two-color lighting device 40.

In each of the red-green combined driving subfields SF1RG, SF2RG, SF3RG, and SF4RG, the shutter controller 58 applies a yellow conversion voltage $V_Y$ to the photonic ink layer 2SI in response to the shutter control signal $C_{2S}$ from the control unit 57. As a result, the color of the photonic ink layer 2SI is converted into yellow, and thus, yellow front light is incident from the two-color spectrum shutter 2S onto the selected cells of the LCD panel 10, then reflected by the two-color lighting device 40, and output through the selected cells. Here, during a time corresponding to the first color driving period while only a single scan pulse is applied to a scan electrode line, only yellow front light and red back light are output through the selected cells of the LCD panel 10 and the two-color spectrum shutter 2S. In addition, during a time corresponding to the second color driving period in the time while only the single scan pulse is applied to the scan electrode line, only yellow front light and cyan back light are output through the selected cells of the LCD panel 10 and the two-color spectrum shutter 2S.

Figure 8A:
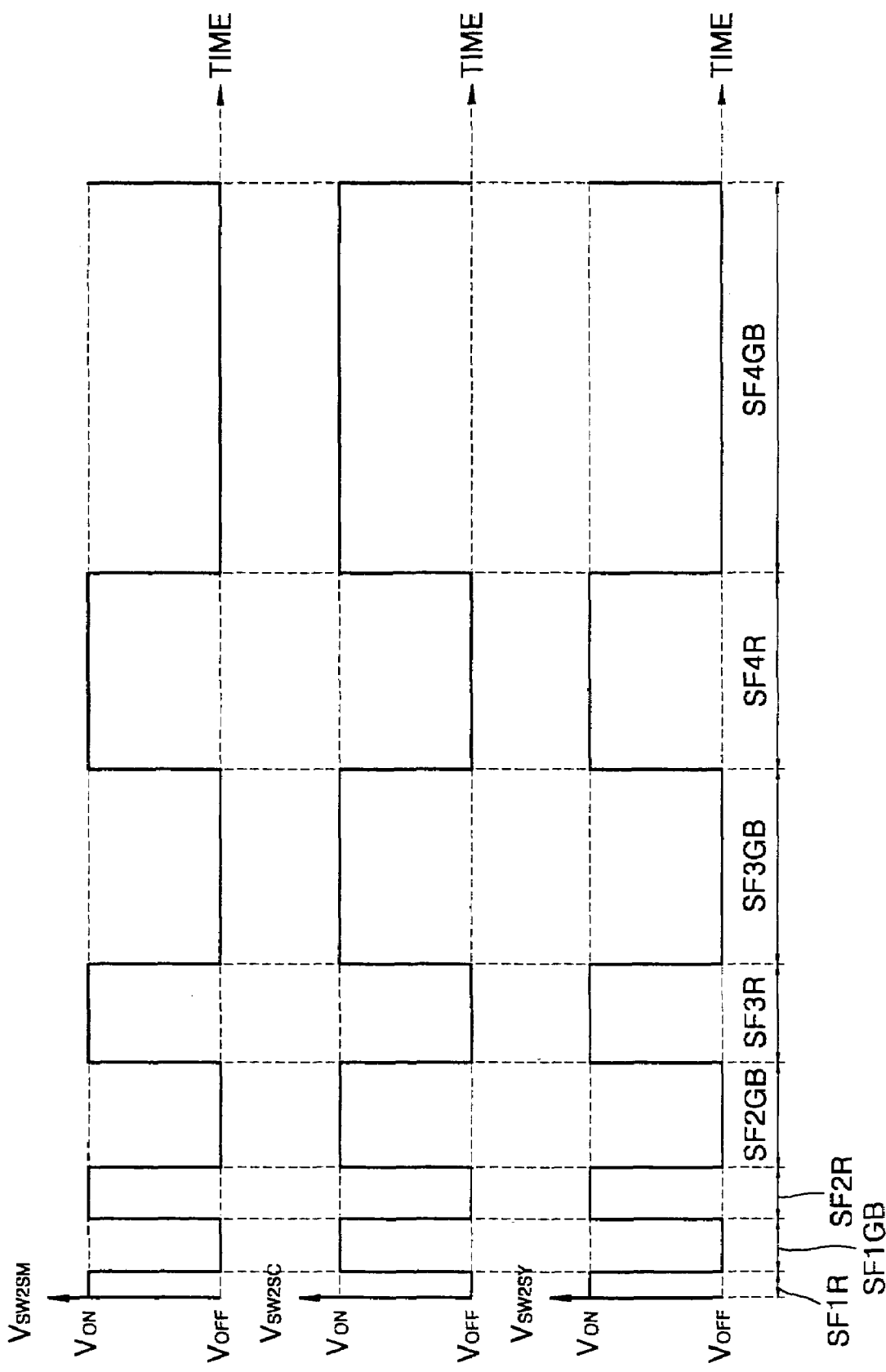
FIG. 8A is a timing chart of waveforms of voltages applied to switches, respectively, shown in FIG. 5 in the frame shown in FIG. 6A when the two-color spectrum shutter and the lighting device shown in FIG. 4A are used.

FIG. 8A is a timing chart of waveforms of voltages applied to the switches $SW_{2SY}$, $SW_{2SC}$, and $SW_{2SM}$, respectively, shown in FIG. 5 in the frame FR shown in FIG. 6A when the two-color spectrum shutter 2S and the two-color lighting device 40 shown in FIG. 4A are used. Referring to FIG. 8A, the second and third color driving periods are combined. Colors activated by the two-color spectrum shutter 2S and the two-color lighting device 40 in each color driving subfield according to the applied voltages shown in FIG. 8A are shown in Table 1.

Referring to FIGS. 1, 4A, 5, 6A, and 8A, and Table 1, in each of the red driving subfields SF1R, SF2R, SF3R, and SF4R, all of the scan electrode lines $LS_1$ through $LS_n$ and the data electrode lines corresponding to red are driven so that cells are selected. The shutter controller 58 turns on only the switch $SW_{2SM}$ for activating magenta and the switch $SW_{2SY}$ for activating yellow. From light which has passed through the selected cells of the LCD panel 10 and reflected from the two-color lighting device 40, magenta light is output from the third liquid crystal panel 2SM through the selected cells, and yellow light is output from the first liquid crystal panel 2SY through the selected cells. As a result, red light in which the magenta light and the yellow light are combined is output from the selected cells together with yellow back light from the two-color lighting device 40.

In each of the green-blue combined driving subfields SF1GB, SF2GB, SF3GB, and SF4GB, the shutter controller 58 turns on only the switch $SW_{2SC}$ for activating cyan in response to the shutter control signal $C_{2C}$ from the control unit 57. Accordingly, from light which has passed through the selected cells of the LCD panel 10 and reflected from the two-color lighting device 40, cyan light is output from the second liquid crystal panel 2SC through the selected cells. Here, in a time allocated to the second color driving period while a single scan pulse is applied to a unit scan electrode line, only cyan front light and yellow back light are output through the selected cells of the LCD panel 10 and the two-color spectrum shutter 2S. In addition, in a time allocated to the third color driving period while the single scan pulse is applied, only cyan front light and blue back light are output through the selected cells of the LCD panel 10 and the two-color spectrum shutter 2S.

Figure 8B:
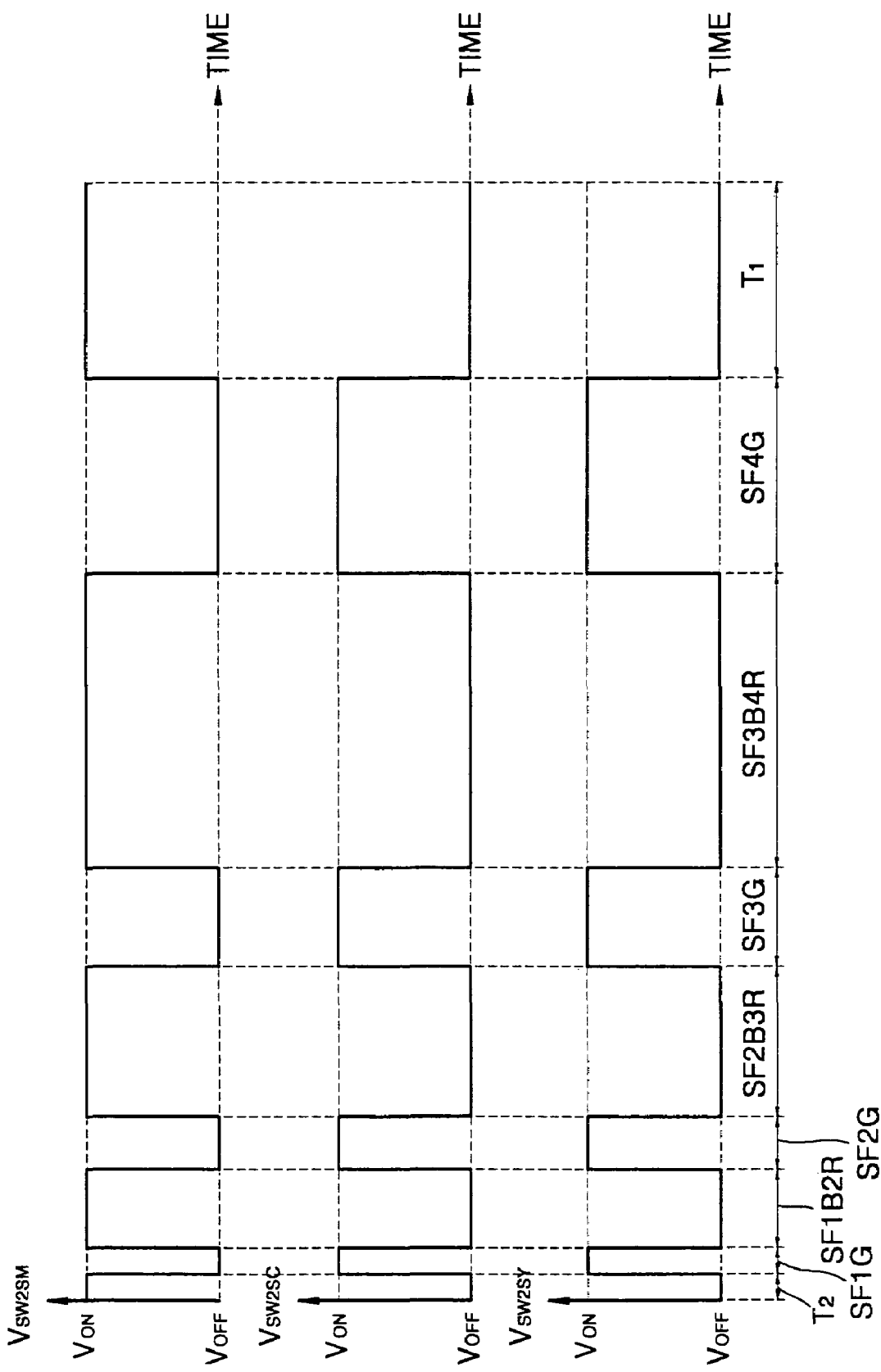
FIG. 8B is a timing chart of waveforms of voltages applied to switches, respectively, shown in FIG. 5 in the frame shown in FIG. 6B when the two-color spectrum shutter and the lighting device shown in FIG. 4B are used.

FIG. 8B is a timing chart of waveforms of voltages applied to switches $SW_{2SY}$, $SW_{2SC}$, and $SW_{2SM}$, respectively, shown in FIG. 5 in the frame FR shown in FIG. 6B when the two-color spectrum shutter 2S and the two-color lighting device 40 shown in FIG. 4B are used. Referring to FIG. 8B, the first and third color driving periods are combined. Colors activated by the two-color spectrum shutter 2S and the two-color lighting device 40 in each color driving subfield according to the applied voltages shown in FIG. 8B are shown in Table 2.

Referring to FIGS. 1, 4B, 5, 6B, and 8B, and Table 2, in each of the green driving subfields SF1G, SF2G, SF3G, and SF4G, all of the scan electrode lines $LS_1$ through $LS_n$ and the data electrode lines corresponding to green are driven so that cells are selected. The shutter controller 58 turns on only the switch $SW_{2SC}$ for activating cyan and the switch $SW_{2SY}$ for activating yellow. From light which has passed through the selected cells of the LCD panel 10 and reflected from the two-color lighting device 40, cyan light is output from the second liquid crystal panel 2SC through the selected cells, and yellow light is output from the first liquid crystal panel 2SY through the selected cells. As a result, green light in which the cyan light and the yellow light are combined is output from the selected cells together with cyan back light from the two-color lighting device 40.

In each of the red-blue combined driving subfields SF1B2R, SF2B3R, and SF3B4R, the shutter controller 58 turns on only the switch $SW_{2SM}$ for activating magenta in response to the shutter control signal $C_{2C}$ from the control unit 57. Accordingly, from light which has passed through the selected cells of the LCD panel 10 and reflected from the two-color lighting device 40, magenta light is output from the third liquid crystal panel 2SM through the selected cells. Here, in a time allocated to the first color driving period in a time while a single scan pulse is applied to a unit scan electrode line, only magenta front light and red back light are output through the selected cells of the LCD panel 10 and the two-color spectrum shutter 2S. In addition, in a time allocated to the third color driving period in the time while the single scan pulse is applied, only magenta front light and cyan back light are output through the selected cells of the LCD panel 10 and the two-color spectrum shutter 2S.

Figure 8C:
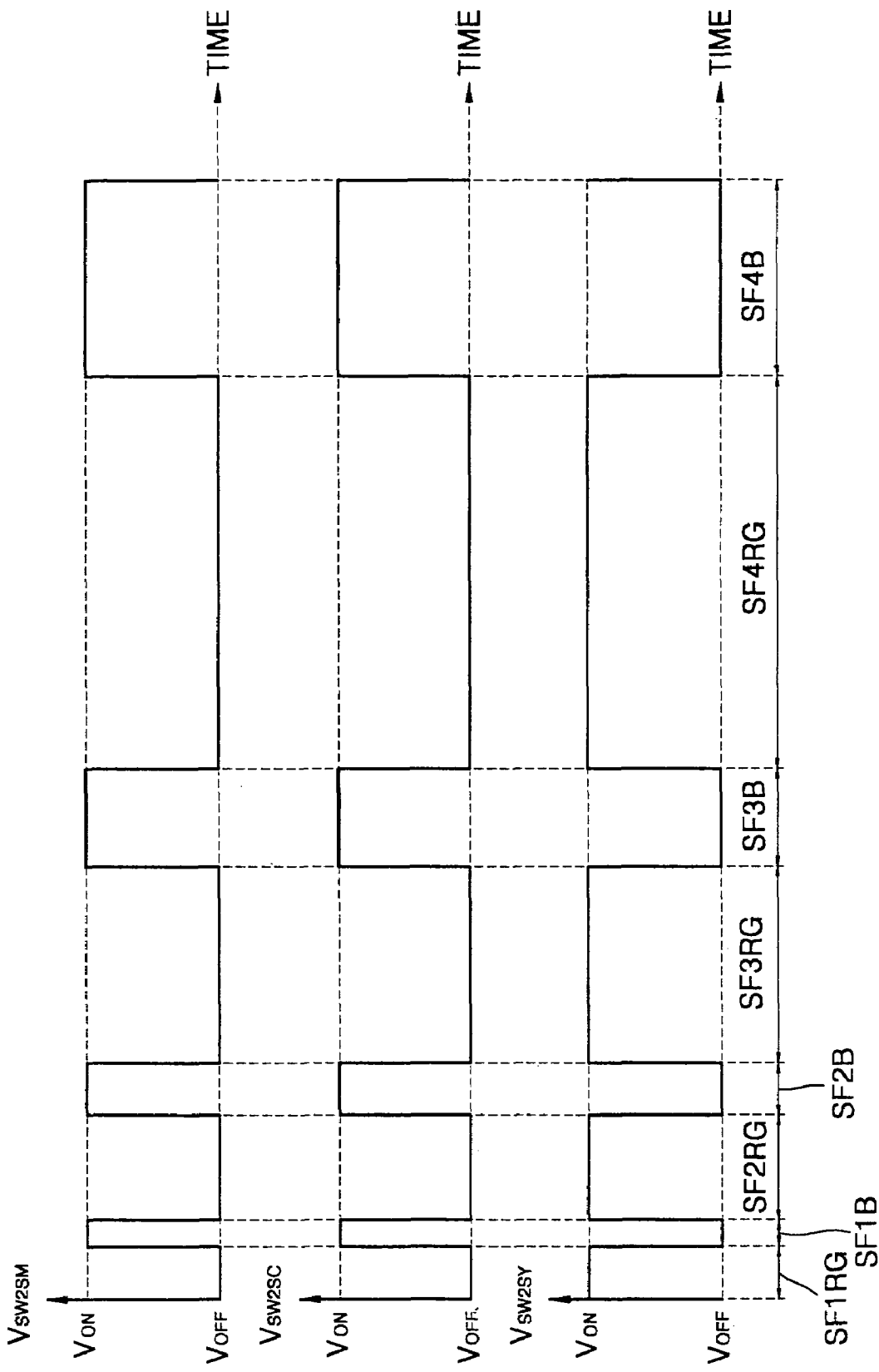
FIG. 8C is a timing chart of waveforms of voltages applied to switches, respectively, shown in FIG. 5 in the frame shown in FIG. 6C when the two-color spectrum shutter and the lighting device shown in FIG. 4B are used.

FIG. 8C is a timing chart of waveforms of voltages applied to switches $SW_{2SY}$, $SW_{2SC}$, and $SW_{2SM}$, respectively, shown in FIG. 5 in the frame FR shown in FIG. 6C when the two-color spectrum shutter 2S and the two-color lighting device 40 shown in FIG. 4B are used. Referring to FIG. 8C, the first and second color driving periods are combined. Colors activated by the two-color spectrum shutter 2S and the two-color lighting device 40 in each color driving subfield according to the applied voltages shown in FIG. 8C are shown in Table 3.

Referring to FIGS. 1, 4B, 5, 6C and 8C, and Table 3, in each of the blue driving subfields SF1B, SF2B, SF3B, and SF4B, all of the scan electrode lines $LS_1$ through $LS_n$ and the data electrode lines corresponding to blue are driven so that cells are selected. The shutter controller 58 turns on only the switch $SW_{2SM}$ for activating magenta and the switch $SW_{2SC}$ for activating cyan. From light which has passed through the selected cells of the LCD panel 10 and then reflected from the two-color lighting device 40, magenta light is output from the third liquid crystal panel 2SM through the selected cells, and cyan light is output from the second liquid crystal panel 2SC through the selected cells. As a result, blue light in which the magenta light and the cyan light are combined is output from the selected cells together with cyan back light from the two-color lighting device 40.

In each of the red-green combined driving subfields SF1RG, SF2RG, SF3RG, and SF4RG, the shutter controller 58 turns on only the switch $SW_{2SY}$ for activating yellow in response to the shutter control signal $C_{2C}$ from the control unit 57. Accordingly, from light which has passed through the selected cells of the LCD panel 10 and reflected from the two-color lighting device 40, yellow light is output from the first liquid crystal panel 2SY through the selected cells. Here, in a time allocated to the first color driving period while a single scan pulse is applied to a unit scan electrode line, only yellow front light and red back light are output through the selected cells of the LCD panel 10 and the two-color spectrum shutter 2S. In addition, in a time allocated to the second color driving period while the single scan pulse is applied, only yellow front light and cyan back light are output through the selected cells of the LCD panel 10 and the two-color spectrum shutter 2S.

As described above, in an LCD apparatus and a method of driving the same according to the present invention, only a single scan pulse can be sequentially applied to scan electrode lines during two color driving periods which are combined. Accordingly, a width of a scan pulse increases efficiently so that high-speed operation can be performed stably. In addition, during the combined two-color driving period among three color driving periods, a two-color spectrum shutter allows front lights having the same color to be incident onto an LCD panel, and a lighting device generates back lights having the same color during two color driving periods among the three color driving periods. Therefore, the two-color spectrum shutter and the lighting device can operate more stably.

Although a few embodiments of the present invention have been shown and described, it will be appreciated by those skilled in the art that changes may be made in these elements without departing from the principles and spirit of the invention, the scope of which is defined in the appended claims and their equivalents.

What is claimed is:

1. A method of driving a liquid crystal display apparatus, which includes a liquid crystal display panel having data electrode lines allocated for three colors and scan electrode lines crossing the data electrode lines and a lighting device installed in the back of the liquid crystal display panel to sequentially generate back lights having different colors, so that a unit driving period is divided into first, second, and third color driving periods, the method comprising a controller sequentially applying a single scan pulse to the scan electrode lines during a two color driving period, in which the two color driving periods among the three color driving periods are combined and two colors are activated while the single scan pulse is applied to the scan electrode lines.

2. The method of claim 1, wherein the first, second, and third color driving periods are red, green, and blue driving subfields, respectively.

3. A liquid crystal display apparatus, comprising:
a liquid crystal display panel having data electrode lines allocated for three colors and scan electrode lines crossing the data electrode lines; and
a lighting device installed in the back of the liquid crystal display panel to sequentially generate back lights having different colors, so that a unit driving period is divided into first, second, and third color driving periods,
wherein a controller sequentially applies a single scan pulse to the scan electrode lines during a two-color driving period, in which two color driving periods among the three color driving periods are combined, and activates two colors while the single scan pulse is applied to the scan electrode lines.

4. The liquid crystal display apparatus of claim 3, wherein the first, second, and third color driving periods are red, green, and blue driving subfields, respectively.

5. The liquid crystal display apparatus of claim 3, further comprising a two-color spectrum shutter which is installed in front of the liquid crystal display panel and allows only front lights having fourth and fifth colors, to be incident onto the liquid crystal display panel,
wherein the lighting device generates back lights having sixth and seventh colors, so that lights having the first through third colors, are output through selected cells of the liquid crystal display panel and the two-color spectrum shutter by combining two among the fourth through seventh colors.

6. The liquid crystal display apparatus of claim 5, wherein when the second and third color driving periods are combined, only front light having the fourth color and back light having the sixth color are output through the selected cells of the liquid crystal display panel and the two-color spectrum shutter during the first color driving period, only front light having the fifth color and back light having the sixth color are output through the selected cells of the liquid crystal display panel and the two-color spectrum shutter during a time allocated to the second color driving period while the single scan pulse is applied, and only front light having the fifth color and back light having the seventh color are output through the selected cells of the liquid crystal display panel and the two-color spectrum shutter during a time allocated to the third color driving period while the single scan pulse is applied.

7. The liquid crystal display apparatus of claim 5, wherein color of the two-color spectrum shutter changes according to an applied voltage.

8. The liquid crystal display apparatus of claim 7, wherein the two-color spectrum shutter is implemented by photonic ink.

9. The liquid crystal display apparatus of claim 5, wherein the first, second, and third color driving periods are red, green, and blue driving subfields, respectively.

10. The liquid crystal display apparatus of claim 9, wherein when the second and third color driving periods are combined, only red front light and yellow back light are output through the selected cells of the liquid crystal display panel and the two-color spectrum shutter during the first color driving period, only cyan front light and yellow back light are output through the selected cells of the liquid crystal display panel and the two-color spectrum shutter during a time allocated to the second color driving period while the single scan pulse is applied, and only cyan front light and blue back light are output through the selected cells of the liquid crystal display panel and the two-color spectrum shutter during a time allocated to the third color driving period while the single scan pulse is applied.

11. The liquid crystal display apparatus of claim 10, wherein the two-color spectrum shutter comprises:
a first liquid crystal panel which outputs light in a yellow wavelength to the liquid crystal display panel at a predetermined driving voltage;
a second liquid crystal panel which outputs light in a cyan wavelength to the liquid crystal display panel at the predetermined driving voltage; and
a third liquid crystal panel which outputs light in a magenta wavelength to the liquid crystal display panel at the predetermined driving voltage.

12. The liquid crystal display apparatus of claim 11, wherein the predetermined driving voltage is applied only to the first and third liquid crystal panels during the first color driving period, and the predetermined driving voltage is applied only to the second liquid crystal panel during the second and third color driving periods.

13. The liquid crystal display apparatus of claim 9, wherein when the first and third color driving periods are combined, only green front light and cyan back light are output through the selected cells of the liquid crystal display panel and the two-color spectrum shutter during the second color driving period, only magenta front light and red back light are output through the selected cells of the liquid crystal display panel and the two-color spectrum shutter during a time allocated to the first color driving period while the single scan pulse is applied, and only magenta front light and blue back light are output through the selected cells of the liquid crystal display panel and the two-color spectrum shutter during a time allocated to the third color driving period while the single scan pulse is applied.

14. The liquid crystal display apparatus of claim 13, wherein the two-color spectrum shutter comprises:
a first liquid crystal panel which outputs light in a yellow wavelength to the liquid crystal display panel at a predetermined driving voltage;
a second liquid crystal panel which outputs light in a cyan wavelength to the liquid crystal display panel at the predetermined driving voltage; and
a third liquid crystal panel which outputs light in a magenta wavelength to the liquid crystal display panel at the predetermined driving voltage.

15. The liquid crystal display apparatus of claim 14, wherein the predetermined driving voltage is applied only to the first and second liquid crystal panels during the second color driving period, and the predetermined driving voltage is applied only to the third liquid crystal panel during the first and third color driving periods.

16. The liquid crystal display apparatus of claim 9, wherein when the first and second color driving periods are combined, only blue front light and cyan back light are output through the selected cells of the liquid crystal display panel and the two-color spectrum shutter during the third color driving period, only yellow front light and red back light are output through the selected cells of the liquid crystal display panel and the two-color spectrum shutter during a time allocated to the first color driving period while the single scan pulse is applied, and only yellow front light and cyan back light are output through the selected cells of the liquid crystal display panel and the two-color spectrum shutter during a time allocated to the second color driving period while the single scan pulse is applied.

17. The liquid crystal display apparatus of claim 16, wherein the two-color spectrum shutter comprises:
 a first liquid crystal panel which outputs light in a yellow wavelength to the liquid crystal display panel at a predetermined driving voltage;
 a second liquid crystal panel which outputs light in a cyan wavelength to the liquid crystal display panel at the predetermined driving voltage; and
 a third liquid crystal panel which outputs light in a magenta wavelength to the liquid crystal display panel at the predetermined driving voltage.

18. The liquid crystal display apparatus of claim 17, wherein the predetermined driving voltage is applied only to the second and third liquid crystal panels during the third color driving period, and the predetermined driving voltage is applied only to the first liquid crystal panel during the first and second color driving periods.

19. The liquid crystal display apparatus of claim 3, wherein during the combined two-color driving period, a two-color spectrum shutter allows front lights having a same color to be incident onto the LCD panel.

20. The method of claim 1, wherein a unit frame includes four subfields so that a gray scale can be displayed using time division.

21. The method of claim 20, wherein the subfields include red driving subfields and combined green-blue driving subfields.

22. The method of claim 20, wherein the subfields include green driving subfields and combined red-blue driving subfields.

23. The method of claim 20, wherein the subfields include blue driving subfields and combined red-green driving subfields.

* * * * *